United States Patent
Liu et al.

(10) Patent No.: US 7,577,261 B2
(45) Date of Patent: Aug. 18, 2009

(54) WIRELESS AUDIO SYSTEM USING WIRELESS LOCAL AREA NETWORK

(75) Inventors: Yen-Ku Liu, Taipei Hsien (TW); Jia-Bin Huang, Taipei (TW)

(73) Assignee: Realtek Semiconductor Corp., Hsinchu (TW)

( * ) Notice: Subject to any disclaimer, the term of this patent is extended or adjusted under 35 U.S.C. 154(b) by 294 days.

(21) Appl. No.: 11/548,692

(22) Filed: Oct. 11, 2006

(65) Prior Publication Data

US 2007/0133817 A1 Jun. 14, 2007

(30) Foreign Application Priority Data

Oct. 13, 2005 (TW) .............................. 94135710 A

(51) Int. Cl.
*H04B 3/00* (2006.01)
(52) U.S. Cl. .................. 381/77; 381/79; 450/550.1; 370/338; 370/395.53; 370/419
(58) Field of Classification Search .............. 370/338, 370/356; 381/315
See application file for complete search history.

(56) References Cited

U.S. PATENT DOCUMENTS

| 2003/0020806 A1* | 1/2003 | Chang et al. ............. 348/14.08 |
| 2003/0152057 A1* | 8/2003 | Chou et al. ................. 370/338 |
| 2006/0121931 A1* | 6/2006 | Lin et al. .................. 455/550.1 |
| 2006/0132382 A1* | 6/2006 | Jannard ......................... 345/8 |

* cited by examiner

*Primary Examiner*—David Q Nguyen
(74) *Attorney, Agent, or Firm*—Thomas, Kayden, Horstemeyer & Risley

(57) ABSTRACT

A wireless audio system includes a first device and a second device. The first device includes a first logic and a first WLAN unit coupled to the first logic. The first logic performs audio processing to generate audio data. The first WLAN unit transmits the audio data through a radio frequency channel. The second device includes a second WLAN unit and an audio reproducing unit coupled to the second WLAN unit. The second WLAN unit receives the audio data from the radio frequency channel. The audio reproducing unit generates sound according to the audio data.

18 Claims, 2 Drawing Sheets

WIRELESS AUDIO SYSTEM USING WIRELESS LOCAL AREA NETWORK

BACKGROUND OF THE INVENTION

1. Field of the Invention

The present invention relates to a wireless local area network (WLAN) and audio system, and more particularly, to a system structure in which a WLAN device is used to simulate an audio input/output interface.

2. Description of the Prior Art

In a conventional computer system, a dedicated sound card is usually used as a processing unit of audio data and an input/output interface of the audio data. The dedicated sound card is coupled to a speaker and/or a microphone through cable(s) with certain specification. Through the speaker, sound corresponding to the audio data generated by the dedicated sound card is reproduced. Through the microphone, sound in the real world is captured and processed by the dedicated sound card to generate corresponding audio data.

In practice, dedicated sound cards constitute only one kind of input/output interface in the computer systems available in the market. With appropriate design, other kinds of data input/output interfaces can also be used to implement the audio input/output interfaces of computer systems.

SUMMARY OF THE INVENTION

According to an embodiment, a wireless audio system is disclosed. The wireless audio system comprises a first device and a second device. The first device comprises a first computing unit and a first WLAN unit. The first computing unit performs audio processing to generate audio data. The first WLAN unit is coupled to the first computing unit and is responsible for transmitting the audio data through a radio frequency channel. The second device comprises a second WLAN unit and an audio reproducing unit. The second WLAN unit receives the audio data from the radio frequency channel. The audio reproducing unit is coupled to the second WLAN unit and is responsible for generating sound according to the audio data.

According to another embodiment, another wireless audio system is disclosed. The wireless audio system comprises a first device and a second device. The first device comprises a first computing unit and a first WLAN unit. The first computing unit performs audio processing on audio data. The first WLAN unit is coupled to the first computing unit and is responsible for receiving the audio data from a radio frequency channel. The second device comprises a second WLAN unit and an audio capturing unit. The second WLAN unit transmits the audio data through the radio frequency channel. The audio capturing unit is coupled to the second WLAN unit and is in charge of converting sound into the audio data.

These and other objectives of the present invention will no doubt become obvious to those of ordinary skill in the art after reading the following detailed description of the preferred embodiment that is illustrated in the various figures and drawings.

DETAILED DESCRIPTION

Along with the advancement of wireless local area network (WLAN) related technology, WLAN interfaces (such as WLAN cards) have already become a basic input/output interface of modern computer systems. Through a WLAN interface, a computer system (such as a personal computer or a notebook-type computer) can establish a wireless communication link with a remote device (such as an access point). Through the wireless communication link, data can be transferred between the computer system and the remote device.

Figure 1:
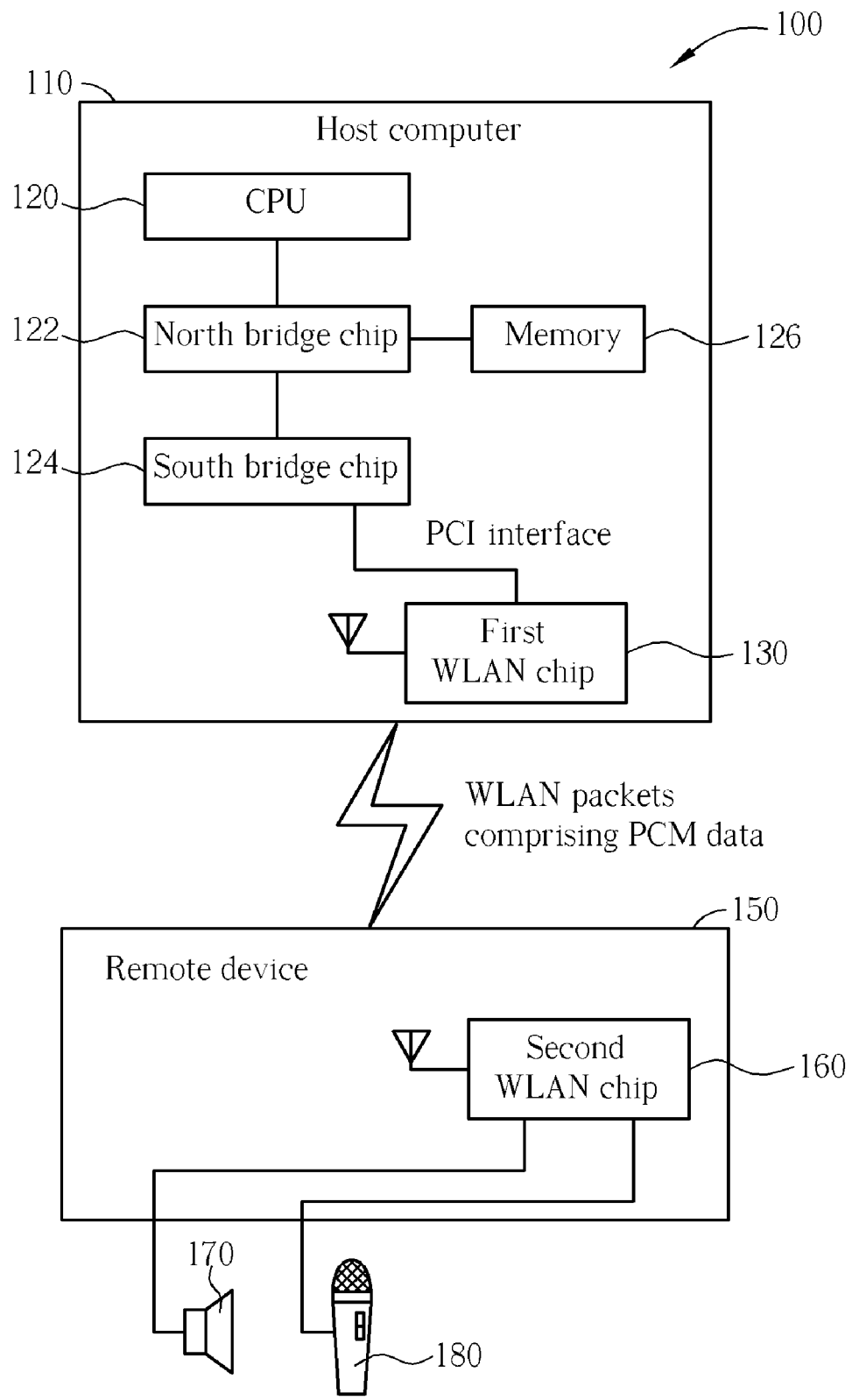
FIG. 1 shows a wireless audio system according to an exemplary embodiment of the present invention.

FIG. 1 shows a wireless audio system 100 according to an exemplary embodiment of the present invention. In FIG. 1, the wireless audio system 100 comprises a host computer 110 and a remote device 150. For instance, the host computer 110 can be implemented by a personal computer or a notebook-type computer, and the remote device 150 can be implemented by a wireless access point (AP). In this embodiment, the host computer 100 (implemented by an ordinary computer) comprises a central processing unit (CPU) 120, a north bridge chip 122, a south bridge chip 124, and other components (such as a memory 126) connected to the system through the north bridge chip 122. In addition, the host computer 110 further comprises a first WLAN chip 130. The first WLAN chip 130 can be realized as a wireless network card or an integrated component of a main board of the host computer 110. Through a bus interface, such as a PCI interface, the first WLAN chip 130 is coupled to the south bridge chip 124 to communicate with the host computer 110.

In this embodiment, the remote device 150 comprises a second WLAN chip 160, such as an access point control chip. The second WLAN chip 160 communicates with the first WLAN chip 130 of the host computer 110 according to specifications of a WLAN standard, such as IEEE 802.11. In addition, the remote device 150 further comprises an audio reproducing unit 170 for reproducing sound and an audio capturing unit 180 for converting sound into audio data. For example, the audio reproducing unit 170 can be implemented by a speaker; and the audio capturing unit 180 can be implemented by a microphone. The audio reproducing unit 170 and the audio capturing unit 180 can be integrated components built into the remote device 150. The audio reproducing unit 170 and the audio capturing unit 180 can also be stand-alone devices connected to the remote device 150 through audio phone jacks.

In the embodiment shown in FIG. 1, the host computer 110 is not equipped with a dedicated audio processing hardware, such as an audio codec chip. After the first WLAN chip 130 is connected to the host computer 110 through the PCI interface, it will be registered as an audio processing unit. More specifically, the host computer 110 views the first WLAN chip 130 as an audio processing unit. Audio data is inputted to or outputted from the host computer 110 through the first WLAN chip 130. In this embodiment, the computational capacity of the CPU 120 is used to account for the functions of an ordinary audio processing hardware, such as audio encoding and/or audio decoding. More specifically, the CPU 120 reads program codes for audio processing from the memory 126. By way of software operations, audio data for output or inputted audio data is processed. After being processed by the CPU 120, the audio data, which may, as an example, conform to standards of pulse code modulation (PCM), is then sent to the first WLAN chip 130 through the PCI interface. The first WLAN chip 130 encodes the audio data into packets of WLAN and sends the packets to the remote device 150 through a radio frequency channel. The second WLAN chip 160 decodes the received packets to generate the original audio data conforming to the PCM standards. Sound is then reproduced by the speaker 170 according to the audio data. In a reversed direction of data flow, the microphone 180 converts captured sound into audio data conforming to the PCM standards. The second WLAN chip 160 encodes the audio data into packets of WLAN and sends the packets to the host computer 110 through a radio frequency channel. The first WLAN chip 130 decodes the received packets to generate the original audio data conforming to the PCM standards. The audio data is then processed by the CPU 120.

In the wireless audio system 100, audio processing is performed on the host computer 110. Processed audio data, which conforms to standards such as PCM, is then transmitted through the radio frequency channel between the first and second WLAN chips 130 and 160. Such a system structure allows audio data to be processed by the host computer 110 and then sent to the remote device 150 for sound reproduction, and it also allows raw audio data to be generated by the remote device 150 and then sent to the host computer 110 for further processing. No complicated audio processing hardware is required to be set in the remote device 150. Only the computational capacity of the host computer 110 is required for audio processing, therefore manufacturing cost is greatly reduced. Please note that the audio data conforming to PCM standard only serves as an example, and audio data conforming to other kinds of audio standards can also be used in other embodiments of the present invention.

Figure 2:
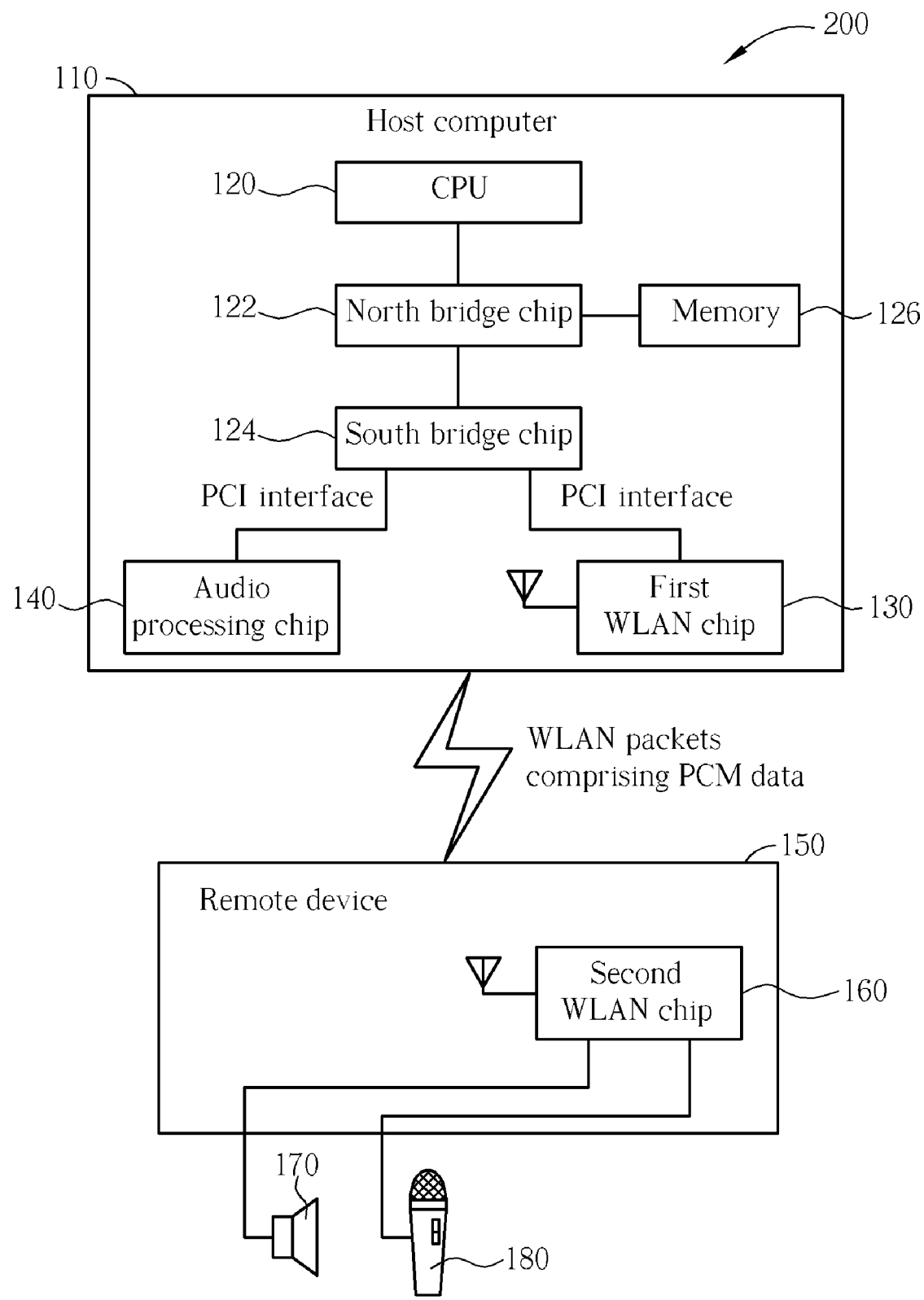
FIG. 2 shows another wireless audio system according to another exemplary embodiment of the present invention.

FIG. 2 shows a wireless audio system 200 according to a second embodiment of the present invention. Most components of the wireless audio system 100 of FIG. 1 are similar to those of the wireless audio system 200 of FIG. 2, and are therefore labeled the same in FIG. 2. The main difference between FIG. 1 and FIG. 2 is that in FIG. 2 the host computer 110 further comprises a dedicated audio processing hardware, i.e., the high-level audio processing chip 140. The audio processing chip 140 may be included in a sound card, which is coupled to the host computer 110 through a PCI interface. Since the computational power provided by the CPU 120 is limited, when highly complicated audio processing is required, the host computer 110 can assign part of, or the entire audio processing tasks to the dedicated audio processing chip 140.

Although a host computer utilizing a north bridge and a south bridge as a main communication channel is used as an example of the host computer 110, host computers having other kinds of structure can also be used in other embodiments of the present invention. For instance, a host computer utilizing a PCI EXPRESS BUS as a main communication channel can also be used to implement the host computer 110. Additionally, although the host computer 110 of the above-mentioned embodiments is a personal computer (PC), other kinds of electronic devices capable of performing audio processing and wireless communication can also be used to implement the host computer 110. Furthermore, although the remote device 150 of the above-mentioned embodiments is an access point (AP), any kinds of electronic devices capable of performing sound reproduction/capturing and wireless communication can be used to implement the remote device 150.

If network bandwidth is sufficient, aside from registering the first WLAN chip 130 as the audio processing unit and inputting/outputting audio data through the first WLAN chip 130, the host computer 110 can also communicate with another WLAN device through the first WLAN chip 130 concurrently. Under this scheme, the first WLAN chip 130 can be viewed as a wireless data communication interface and a wireless audio input/output interface of the host computer 110 at the same time. In addition, Multiple BSSID is a technology that can be applied by the first WLAN chip 130 when the above-mentioned two roles are performed by the first WLAN chip 130 at the same time.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless audio system comprising:
   a first device comprising:
      a first computing unit for performing audio processing to generate audio data; and
      a first WLAN unit coupled to the first computing unit, for transmitting the audio data through a radio frequency channel; and
   a second device, forming a wireless connection with the first device, the second device comprising:
      a second WLAN unit for receiving the audio data from the radio frequency channel; and
      an audio reproducing unit coupled to the second WLAN unit, for generating sound according to the audio data;
   wherein the first device registers the first WLAN unit as an audio processing unit, and the wireless audio system registers the first WLAN unit and second WLAN unit as an audio in/our interface of the first computing unit.

2. The wireless audio system of claim 1, wherein the first computing unit performs an audio decoding process to generate the audio data.

3. The wireless audio system of claim 2, wherein the audio data generated through the audio decoding process conforms to the format of pulse code modulation.

4. The wireless audio system of claim 3, wherein the first computing unit comprises a central processing unit.

5. The wireless audio system of claim 3, wherein the first computing unit comprises a dedicated audio processing hardware.

6. The wireless audio system of claim 3, wherein the audio reproducing unit comprises a speaker.

7. The wireless audio system of claim 1, wherein the audio data that is transmitted through the radio frequency channel conforms to the format of pulse code modulation.

8. The wireless audio system of claim 7, wherein the first WLAN unit encodes the audio data conforming to the forma of pulse code modulation into at least one WLAN packet for wireless transmission.

9. The wireless audio system of claim 1, wherein the first WLAN unit and the second WLAN unit communicate wirelessly according to the specifications of IEEE 802.11.

10. A wireless audio system comprising:
    a first device comprising:
       a first computing unit for performing audio processing on audio data; and
       a first WLAN unit coupled to the first computing unit, for receiving the audio data from a radio frequency channel; and
    a second device, forming a wireless connection with the first device, the second device comprising:
       a second WLAN unit for transmitting the audio data through the radio frequency channel; and
       an audio capturing unit coupled to the second WLAN unit, for converting sound into the audio data;
    wherein the first device registers the first WLAN unit as an audio processing unit, and the wireless audio system registers the first WLAN unit and second WLAN unit as an audio in/out interface of the first computing unit.

11. The wireless audio system of claim 10, wherein the first computing unit performs an audio encoding processing on the audio data.

12. The wireless audio system of claim 11, wherein the audio data on which the audio encoding processing is performed conforms to the format of pulse code modulation.

13. The wireless audio system of claim 12, wherein the first computing unit comprises a central processing unit.

14. The wireless audio system of claim 12, wherein the first computing unit comprises a dedicated audio processing hardware.

15. The wireless audio system of claim 12, wherein the audio capturing unit comprises a microphone.

16. The wireless audio system of claim 10, wherein the audio data that is transmitted through the radio frequency channel conforms to the format of pulse code modulation.

17. The wireless audio system of claim 16, wherein the second WLAN unit encodes the audio data conforming to the formal of pulse code modulation into at least one WLAN packet for wireless transmission.

18. The wireless audio system of claim 10, wherein the first WLAN unit and the second WLAN unit communicate wirelessly according to the specifications of IEEE 802.11.

* * * * *